United States Patent [19]

Dobbins et al.

[11] 4,386,057

[45] May 31, 1983

[54] RECOVERY OF IRON OXIDE FROM COAL FLY ASH

[75] Inventors: Michael S. Dobbins; Marlyn J. Murtha, both of Ames, Iowa

[73] Assignee: The United States of America as represented by the United States Department of Energy, Washington, D.C.

[21] Appl. No.: 358,958

[22] Filed: Mar. 17, 1982

[51] Int. Cl.³ ............................................. C01G 49/02
[52] U.S. Cl. ..................................... 423/138; 423/111; 423/150; 423/113; 423/131; 423/132
[58] Field of Search ............... 423/111, 118, 113, 131, 423/132, 138, 140

[56] References Cited

U.S. PATENT DOCUMENTS 1,873,642 8/1932 Guertler .......................... 423/113
3,198,622 8/1965 Herzog et al. ..................... 423/119
4,242,313 12/1980 Torma ............................. 423/132
4,254,088 3/1981 McDowell et al. ................. 423/111

*Primary Examiner*—Herbert T. Carter
*Attorney, Agent, or Firm*—James W. Weinberger; Walter L. Rees; Richard G. Besha

[57] ABSTRACT

A high quality iron oxide concentrate, suitable as a feed for blast and electric reduction furnaces is recovered from pulverized coal fly ash. The magnetic portion of the fly ash is separated and treated with a hot strong alkali solution which dissolves most of the silica and alumina in the fly ash, leaving a solid residue and forming a precipitate which is an acid soluble salt of aluminosilicate hydrate. The residue and precipitate are then treated with a strong mineral acid to dissolve the precipitate leaving a solid residue containing at least 90 weight percent iron oxide.

9 Claims, 1 Drawing Figure

RECOVERY OF IRON OXIDE FROM COAL FLY ASH

CONTRACTUAL ORIGIN OF THE INVENTION

The U.S. Government has rights in this invention pursuant to Contract No. W-7405-ENG-82 between the U.S. Department of Energy and Ames Laboratory.

BACKGROUND OF THE INVENTION

This invention relates to a process for the recovery of iron from coal fly ash. More specifically, this invention relates to a process for recovering iron oxide, as a concentrate suitable for reduction, from pulverized coal fly ash.

Fly ash is being produced in increasing quantities as the result of the expanding use of pulverized coal to produce electricity. Fly ash is formed from the inorganic constituents present in the coal, and is collected from the flue gases by mechanical separation and/or electrostatic precipitation. The primary constituents of the ash are the oxides of silicon, aluminum, iron and calcium. In addition, trace elements of selenium, arsenic and other heavy metals are present. These trace components, some of which are toxic, cause environmental problems in the long term disposal of the ash.

The treatment of fly ash to recover its constituent metals has been proposed as an alternative to its disposal. Alumina is the primary product although titanium, iron, and some of the trace metals may also be recovered. Some of the proposed processes produce an iron-rich fraction from a pretreatment step to remove iron by magnetic separation of the ash. Direct uses for the magnetic fraction include heavy media material for coal washing and filler for high density cement. In addition, its use as an iron ore has been suggested, but attempts to market the material have not been successful.

About 10 to 15 weight percent of the fly ash resulting from the combustion of pulverized eastern and midwestern bituminous coal has magnetic properties which allow separation from the nonmagnetic fly ash through the use of various magnetic separation devices. In general, 60 to 70 weight percent of this magnetic fraction is $Fe_2O_3$, the remainder consisting of oxides of aluminum, silicon and other heavy metals.

Processes for the recovery of iron and aluminum have generally consisted of various methods of chlorination to produce metal chlorides which are then separated and reduced to obtain the metal. One such process is described in U.S. Pat. No. 4,159,310, which was issued June 26, 1979 to Reynolds et al.

In U.S. Pat. No. 4,130,627, fly ash is treated with a solution at pH 11-14 and filtered solids are then treated with HCl or HF to form a solution of chlorides or fluorides of iron and aluminum. The iron is then recovered by electrodeposition at pH 1-3.

Treatment of the magnetic portion of the fly ash with only a strong alkali leach, such as 30 weight percent NaOH and at low fly ash to alkali ratios such as 50 to 70 grams ash per liter of solution has not proven successful in beneficiating the iron oxide due to the limited solubility of the oxides of silicon and aluminum in the caustic solution. Furthermore, the economic factors involved in the use of many of these chemical compounds, particular the caustics, makes many beneficiation or recovery processes unfeasible.

SUMMARY OF THE INVENTION

An improved process has been developed which utilizes a strong alkali leach to remove the oxides of silicon and aluminum which not only increases the iron oxide constituents of magnetic fly ash, but does so while using substantially less alkali than do the prior art processes.

It has been found that while the oxides of silicon and aluminum have only limited solubility in strong alkalis, they are leached from the fly ash to a greater extent than heretofore thought possible, and form an alkali insoluble aluminosilicate hydrate which precipitates out on the fly ash residue. It has further been found that this hydrate is soluble in acid and can therefore be separated from the fly ash residue containing the iron oxide.

Therefore, in the process of the invention, the magnetic fraction of pulverized coal fly ash containing iron oxide, silica and alumina is contacted with a strong alkali solution at a temperature, and for a period of time sufficient to leach most of the silica and alumina from the fly ash leaving a solid residue containing the iron oxide, the silica and alumina forming a precipitate which is an acid-soluble salt of aluminosilicate hydrate which precipitates out on the solid residue. The precipitate and residue are separated from the alkali solution and contacted with a strong mineral acid which dissolves the precipitate leaving a solid residue containing at least 90 weight percent $Fe_2O_3$.

It is therefore one object of the invention to provide an improved process for removing silica and alumina from the magnetic portion of pulverized coal fly ash containing alumina, silica and iron oxide.

It is another object of the invention to provide an improved process for beneficiating iron oxide in the magnetic portion of coal fly ash containing this and other oxides.

Finally, it is the object of the invention to provide an improved process for beneficiating iron oxide in the magnetic portion of coal fly ash to provide an iron concentrate suitable for use in either a blast furnace or an electric furnace smelter.

DETAILED DESCRIPTION OF PREFERRED EMBODIMENT

Figure 1:
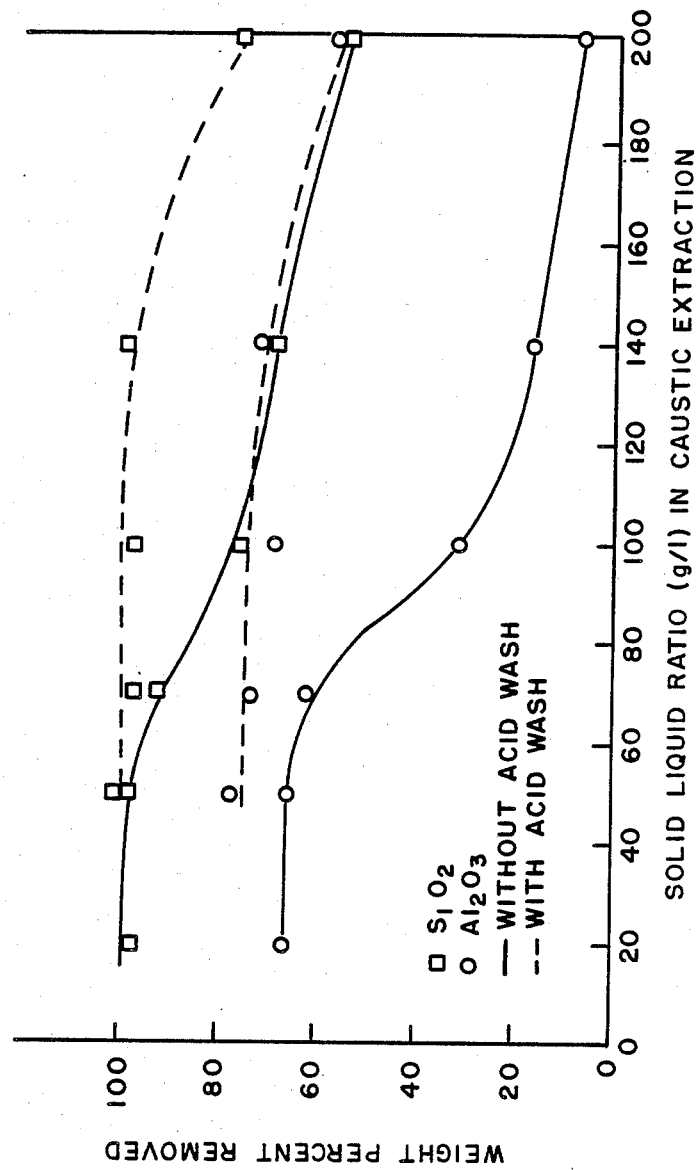
FIG. 1 compares the amount of $SiO_2$ and $Al_2O_3$ removed in the prior art process with the process of this invention.
Figure 2:
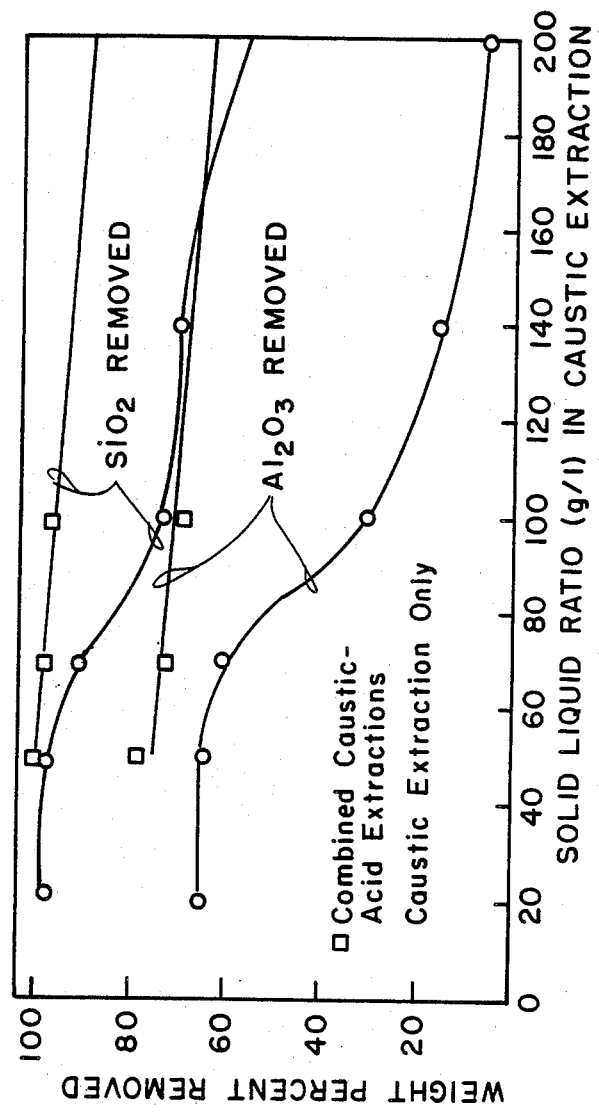

These and other objects of the invention for recovering iron oxide from pulverized, bituminous coal fly ash may be met by separating the magnetic portion from the nonmagnetic portion of the fly ash, contacting the magnetic fly ash with a strong alkali solution in a ratio of 200 to 300 gms fly ash per liter of solution, the solution containing 10 to 20 weight percent of sodium or potassium hydroxide, at a temperature of 150° to 175° C. for one-half to 1 hour to dissolve about 90 weight percent of the silica and about 75 weight percent of the alumina in the fly ash, leaving a solid residue containing the iron oxide. The dissolved silica and alumina form an acid-soluble aluminosilicate hydrate salt of the strong alkali which precipitates out on the solid residue. The precipatate and residue are separated from the alkali solution and contacted with a 0.5 to 1.0 M HCl or $H_2SO_4$ solution in a ratio of about 200 to 300 gms residue and precipitate per liter to dissolve the precipitate leaving a solid residue containing at least 90 weight percent iron oxide.

The process of the invention is suitable for use with any coal fly ash containing oxides of iron, silicon and aluminum in addition to minor amounts of other metals. Generally this includes bituminous coal from eastern and midwestern sources and does not include western sub-bituminous coal which contains little or no iron oxides.

Separation of the magnetic portion of the fly ash can be accomplished by any of the methods known to those with skill in the art. It has been noted however best results were attained using relatively low, field gradient power settings because increased power draws alumina and silica gaugue material into the magnetic fraction.

The strong alkali may be either sodium hydroxide or potassium hydroxide. The alkali must be of sufficient concentration to dissolve the silica and alumina in the fly ash. Thus the concentration may range from 5 to 30 weight percent, preferably from 10 to 20 weight percent.

The ratio of fly ash to alkali solution may vary from about 70 to 400 gms fly ash per liter of solution. Below about 70 grams the precipitate does not form and silica and alumina are dissolved only to the extent of their solubility in the solution. Above about 400 gms, the dissolution rate becomes prohibitively slow. Preferably the range is about 200 to 300 gms/liter. This provides a good compromise between the rate of solution of the oxides and the economies of the alkali solution. Dissolution temperature may range for about 100° to 300° C. with a range of 150° to 175° C. being preferred, since this represents a temperature at which dissolution readily takes place, while reducing the operating pressures which would be required of the equipment.

The unique feature of the process is that under the operating parameters, dissolution of the silica and alumina continue even after the alkali solution has become saturated with these compounds. This is due to the discovery that once the alkali solution becomes saturated with silica and alumina, a precipitate forms which is an aluminosilicate hydrate salt of the alkali metal. Thus, dissolution of these compounds continues until almost all, generally about 90% of the silica and about 75% of the alumina present in the fly ash has been dissolved and precipitated. The amount of dissolution is self limiting to some extent because the precipitate covers the solid residue, reducing solution-residue contact.

Since the process is not dependent upon the solubility of silica and alumina in the caustic, a fly ash to caustic ratio in the range of 200 to 400 gms fly ash/liter caustic was found to provide satisfactory results. This presents a substantial decrease in process cost over prior art ratios of 50 to 70 gms/liter.

The time required to dissolve the silica and alumina must be that sufficient to remove about 90% of the silica and 75% of the alumina present in the fly ash. Under the preferred process parameters this generally ranges from one-half to one hour.

Once dissolution and subsequent precipitation are complete, the solid residue and precipitate are separated from the alkali solution by any usual means, such as vacuum filtration.

The precipitate and solid residue are then contacted with a strong mineral acid such as hydrochloride or a sulfuric which dissolve the aluminosilicate hydrate leaving the solid residue which now contains at least 90, and generally about 95 weight percent iron oxide. While acid concentration is not critical, from about 0.25 to 1 M is satisfactory. The weight/volume ratio may vary from about 100 to 400, preferably 200 to 300 gm residue and precipitate per liter acid. Dissolution time is rapid at room temperature, generally about 10 minutes.

Since very little alkali is used up during dissolution, it is possible to reuse the alkali solution on fresh fly ash a number of times, replacing only the alkali metal ion used in the formation of the hydrate.

The following Examples are given to illustrate the process of the invention and are not to be taken as limiting the scope on extent of the invention as defined by the claims appended hereto.

EXAMPLE I

A number of magnetic fly ashes were caustic leached under various conditions and the extracted residues analyzed. The results are given in Table I below:

TABLE I

| Extraction Conditions | | | | Chemical Composition Of Extracted Residues Wt. Percent | | | |
|---|---|---|---|---|---|---|---|
| Solid-Liquid g/l | Temp °C. | Time min. | Solvent Wt. % NaOH | $Fe_2O_3$ | $Al_2O_3$ | $SiO_2$ | Fe |
| 70 | 150 | 60 | 20 | 77.4 | 7.4 | 8.0 | 54.1 |
| 70 | 150 | 60 | 30 | 79.6 | 6.5 | 4.5 | 55.6 |
| 70 | 200 | 15 | 30 | 83.7 | 4.7 | 4.6 | 58.5 |
| 70 | 200 | 30 | 30 | 86.8 | 5.6 | 5.1 | 60.7 |
| 70 | 200 | 60 | 10 | 70.2 | 8.5 | 11.1 | 49.0 |
| 70 | 200 | 60 | 20 | 76.0 | 7.7 | 8.9 | 52.9 |
| 200 | 200 | 60 | 30 | 76.1 | 6.4 | 8.4 | 53.2 |

The results show that changing the caustic leaching conditions did not greatly effect the residue composition.

EXAMPLE II

The caustic leached material of Example I was subjected to an acid wash by agitating one gram of a caustic leached residue in 10 ml of 2N HCl for 10 minutes at 60° C. The data in Table II show that a wide combination of caustic and acid leaches give a product with only 5 to 6 weight percent combined alumina and silica, and that a solid/caustic ratio of 200 gm/liter gave results almost as good at those with much lower solid/caustic rations.

TABLE II

| Extraction Conditions | | | | | | | Chemical Composition Of Extracted Residues Wt Percent | | | |
|---|---|---|---|---|---|---|---|---|---|---|
| Caustic | | | | Acid, 2N HCl | | | | | | |
| Solid-Liquid g/l | Temp °C. | Time min | Solvent Wt % NaOH | Solid-Liquid g/l | Temp °C. | Time min | $Fe_2O_3$ | $Al_2O_3$ | $SiO_3$ | Fe |
| 70 | 150 | 60 | 20 | 100 | 60 | 10 | 90.6 | 4.5 | 2.2 | 63.4 |
| 70 | 150 | 60 | 30 | 100 | 60 | 10 | 88.2 | 4.2 | 2.1 | 61.7 |
| 70 | 200 | 15 | 30 | 100 | 60 | 10 | 91.9 | 4.5 | 3.1 | 64.2 |
| 70 | 200 | 30 | 30 | 100 | 60 | 10 | 94.4 | 4.0 | 1.9 | 66.1 |
| 70 | 200 | 60 | 10 | 100 | 60 | 10 | 89.5 | 4.6 | 2.1 | 62.6 |
| 70 | 200 | 60 | 20 | 100 | 60 | 10 | 89.4 | 4.5 | 1.3 | 62.5 |

TABLE II-continued

| Extraction Conditions | | | | | | | Chemical Composition Of Extracted Residues | | | |
|---|---|---|---|---|---|---|---|---|---|---|
| Caustic | | | | Acid, 2N HCl | | | Wt Percent | | | |
| Solid-Liquid g/l | Temp °C. | Time min | Solvent Wt % NaOH | Solid-Liquid g/l | Temp °C. | Time min | $Fe_2O_3$ | $Al_2O_3$ | $SiO_3$ | Fe |
| 200 | 200 | 60 | 30 | 100 | 60 | 10 | 88.2 | 4.2 | 2.1 | 61.7 |

EXAMPLE III

Another series of experiments were made to determine the effect of increasing the fly ash-caustic solution ratio on silica and alumina removal. Samples of magnetic fly ash from Missouri coal were leached with 30% sodium hydroxide for one hour at 200° C. The caustic-leached fly ash was then treated with 2 M HCl at 60° C. for 10 minutes at 100 gms/liter solid-liquid ratio. The results for that analysis of caustic extraction and caustic-acid extractor for silica and alumina are shown in FIG. 1. These results show that, at solid liquid ratios less than 50 gms per liter, the acid wash does not increase the percentage of silica dissolved, although an additional 15% alumina is removed. As the solid-liquid ratio of the caustic extraction is increased the effect of acid washing is more pronounced. For 140 gms per liter caustic extractions, the silica removal is 70% and the alumina removal is 16%. With acid washing, the silica and alumina removals increase to 97 and 71% respectively, which is equivalent to a caustic treatment at 50 gms per liter. This clearly shows the potential for operating under less severe caustic conditions which well increase the economic feasibility of beneficiating magnetic fly ash for use as iron ore.

TABLE III

| Component | Caustic Extraction #1 | Caustic Extraction #2 | Acid Extraction |
|---|---|---|---|
| $Fe_2O_3$ Wt. % | 76.7 | 71.6 | 93.1 |
| $SiO_2$ Wt. % | 7.79 | 9.92 | 2.65 |
| $Al_2O_3$ Wt. % | 7.43 | 8.23 | 3.61 |
| $Na_2O$ Wt. % | 3.83 | 4.92 | 0.01 |

The compositions of the solid residues from the two alkali extractions are quite different, the residue from the second extraction is higher in alumina and silica, and much higher in soda contact. After acid extraction, however, most of the alumina, silica, and soda are removed and the residue meets specifications for iron ore reduction.

EXAMPLE V

In a manner similar to the previous Example, samples of magnetic fly ash were leached with caustic, the first sample with NaOH and second and third with the separated filtrates from the previous leachings. The leachings were conducted at 200° C. for 30 minutes, the initial solution was 30 weight percent NaOH, and 200 gms ash per liter solution. Chemical analysis of the three residues are given in Table IV.

TABLE IV

| | | Chemical Composition, Wt. Percent Magnetic Fly Ash Residues After Leaching With | | | | | |
|---|---|---|---|---|---|---|---|
| Components | Magnetic Fly Ash As Separated, Dry Method | 30 wt %[1] NaOH | Acid[2] Wash | Filtrate[1] from 1st Leach | Acid[2] Wash | Filtrate[1] from 2nd Leach | Acid[2] Wash |
| $Fe_2O_3$ | 73.6 | 80.3 | 94.4 | 77.5 | 94.0 | 77.8 | 94.7 |
| $SiO_2$ | 16.6 | 4.9 | 1.5 | 6.1 | 1.7 | 6.1 | 1.8 |
| $Al_2O_3$ | 7.1 | 7.4 | 3.7 | 7.7 | 3.8 | 8.0 | 3.8 |
| CaO | 1.1 | 1.2 | | 1.2 | | 1.2 | |
| $Na_2O$ | 0.1 | 3.3 | | 4.0 | | 4.1 | |
| $TiO_2$ | 0.4 | 0.2 | | 0.2 | | 0.3 | |
| MgO | 0.2 | 0.4 | | 0.4 | | 0.4 | |
| $K_2O$ | 0.6 | — | | — | | — | |
| $P_2O_5$ | 0.1 | 0.1 | | 0.1 | | 0.1 | |
| Wt Residue, gms | 100.0 | 89.7 | 76.1 | 93.6 | 77.5 | 91.2 | 75.9 |

[1]200 g ash/liter, 200° C., 30 min.
[2]100 g/liter, 65° C., 10 min, 0.5 N HCl

EXAMPLE IV

A test was conducted to determine if recycled caustic leach liquid can extract material from fly ash or if fresh alkali solution is required. An alkali extraction was made for 30 minutes at 200° C. with 30 weight percent NaOH and 140 gms magnetic fly ash per liter of solution. The filtrate from this extraction was then used to extract another ash sample under the same extraction conditions. The solid residue from that extraction was then leached with 2 N HCl for 10 minutes at 60° C. and 100 gms solid per liter of acid. The results are given in Table III.

Reuse of the caustic solution to attack fresh ash solids dissolved about 10% less silica but about 65% of the silica was dissolved in the recycled liquor. As the silica dissolves, the alumina is extracted from the fly ash matrix but then precipitates on the particle surfaces. The data shows no net removal of alumina from the fly ash in the caustic step. These caustic leached samples which were coated with a precipitate were each acid washed and a high quality iron product resulted when the precipitated material was dissolved.

EXAMPLE VI

A series of acid washes of caustic-leached solid residue were made under varying conditions.

TABLE V

| Acid Treatment[1] | | Residue Composition Wt. Percent | | |
|---|---|---|---|---|
| HCl Conc. | Temp. °C. | $Fe_2O_3$ | $SiO_2$ | $Al_2O_3$ |
| — | | 84.0 | 4.8 | 6.5 |
| 0.1 N | 22 | 88.6 | 3.5 | 5.5 |
|  | 45 | 87.8 | 4.0 | 6.1 |
|  | 65 | 87.2 | 4.4 | 6.4 |
| 0.5 N | 65 | 94.2 | 0.6 | 3.6 |
| 1.0 N | 65 | 94.4 | 0.6 | 4.3 |
| 1.5 N | 65 | 95.1 | 0.7 | 3.8 |
| 2.0 N | 65 | 95.5 | 0.7 | 3.7 |

[1]100 g solid/liquid, 10 min.

As seen from Table V, acid washes with 0.1 N HCl were not effective even at increased temperatures. Acid washes with 0.5 N at 65° C. were effective. The dissolution of silica and alumina was nearly equal to that of washes with higher acid concentrations, but with the lower acid concentrations the amounts of iron dissolved are reduced.

EXAMPLE VII

A series of experiments were made on Missouri coal fly ash to determine the effect of caustic and acid strengths at various temperature on the iron content of the solid residue. The conditions and results are given in Table VI.

TABLE VI

| | Acid Treatment[2] | | | | | | | | |
|---|---|---|---|---|---|---|---|---|---|
| | 0.5 N HCl Wt. Percent | | | 0.5 N $H_2SO_4$ Wt. Percent | | | 1.0 N $H_2SO_4$ Wt. Percent | | |
| Caustic Treatment[1] | $Al_2O_3$ | $SiO_2$ | $Fe_2O_3$ | $Al_2O_3$ | $SiO_2$ | $Fe_2O_3$ | $Al_2O_3$ | $SiO_2$ | $Fe_2O_3$ |
| 20 wt % NaOH | | | | | | | | | |
| 200° C. | 4.8 | 2.5 | 93.3 | 4.7 | 1.6 | 93.4 | 4.4 | 1.2 | 94. |
| 175° C. | 4.4 | 2.6 | 93.6 | | | | 4.3 | 1.6 | 94. |
| 10 wt % NaOH | | | | | | | | | |
| 200° C. | 4.3 | 2.7 | 92.9 | 4.5 | 2.1 | 92.5 | 4.6 | 1.6 | 93. |
| 175° C. | 4.5 | 3.4 | 92.8 | 4.7 | 2.1 | 92.9 | 4.6 | 2.0 | 93. |
| 150° C. | 4.5 | 3.6 | 92.3 | 4.6 | 2.9 | 92.3 | 5.0 | 2.5 | 92. |

[1]0.5 hr, 200 g ash/liter
[2]20 minutes, 65° C., 100 g residue/liter

The results show that the use of 10 weight percent caustic and 0.5 N acid produced results almost equal to those obtained with stronger caustic and acid.

EXAMPLE VIII

An additional series of tests were made to determine the operability of less severe parameters. In these tests, samples of ash were caustic treated in 10 weight percent NaOH at 175° C. for 0.5 hours in a ratio of 200 gm/liters caustic. Samples of this caustic treated residue were then acid washed at room temperature using both 0.5 N $H_2SO_4$. Solid/liquid ratios of 100, 200, 300, and 400 g residue/liter were used. The results are given in Table VII.

TABLE VII

| | Acid Treatment | | | | | |
|---|---|---|---|---|---|---|
| | 0.5 N $H_2SO_4$ Wt. Percent | | | 1.0 N $H_2SO_4$ Wt. Percent | | |
| Solid-Liquid Ratio g/l | $Al_2O_3$ | $SiO_2$ | $Fe_2O_3$ | $Al_2O_3$ | $SiO_2$ | $Fe_2O_3$ |
| 100 | 5.1 | 3.3 | 89.5 | 5.2 | 1.7 | 90.5 |
| 200 | 5.5 | 3.7 | 88.0 | 4.8 | 1.9 | 88.8 |
| 300 | 6.8 | 4.9 | 86.9 | 4.8 | 2.2 | 89.1 |
| 400 | 7.8 | 6.1 | 82.7 | 5.5 | 3.7 | 86.5 |

[1]10 wt. percent NaOH, 0.5 hr, 175° C., 200 g ash/liter, 23° C., 10 minute acid wash The results show that a product containing over 87.5 weight percent iron oxide results for solid-liquid ratios as high as 300 g/l with 1 N $H_2SO_4$ and 200 g/l with 0.5 N $H_2SO_4$.

EXAMPLE IX

Tests were made on magnetic ashes separated from several different coal fly ashes using 10 weight percent caustic extractions at 175° C. and acid washing with 0.5 N $H_2SO_4$.

TABLE VIII

| | Coal Fly Ash | | | | | | | | |
|---|---|---|---|---|---|---|---|---|---|
| | Missouri Wt. Percent | | | Kentucky Wt. Percent | | | West Virginia Wt. Percent | | |
| Sequential Treatment | $Al_2O_3$ | $SiO_2$ | $Fe_2O_3$ | $Al_2O_3$ | $SiO_2$ | $Fe_2O_3$ | $Al_2O_3$ | $SiO_2$ | $Fe_2O_3$ |
| Magnetic Separation | 4.7 | 15.2 | 75.3 | 8.3 | 20.0 | 65.9 | 8.8 | 16.1 | 67.7 |
| Caustic Extraction[1] | 7.4 | 7.6 | 78.6 | 6.8 | 6.8 | 80.0 | 9.1 | 9.1 | 71.9 |
| Acid Wash[2] | 5.1 | 3.3 | 89.5 | 3.1 | 5.4 | 88.8 | 2.4 | 5.8 | 89.2 |

[1]10 wt. percent NaOH, 175° C., 0.5 hr, 200 g ash/liter
[2]0.5 N $H_2SO_4$, 23° C., 10 minutes, 100 g residue/liter As can be seen from the preceeding discussion and Examples, the process of the invention provides an effective means for utilizing coal fly ash by recovering an important resource from it.

The embodiments of this invention in which an exclusive property or privilege is claimed are defined as follows:

1. A process for recovering iron oxide from coal fly ash containing iron oxide, silica and alumina which comprises:

separating the magnetic portion from the non-magnetic portion of the fly ash, contacting the magnetic portion of the fly ash with a strong alkali solution at a temperature and for a period of time sufficient to leach most of the silica and alumina from the fly ash leaving a solid residue containing the iron oxide, forming a precipitate which is an acid-soluble salt of aluminosilicate hydrate, separating the alkali solution from the precipitate and the solid residue; and contacting the precipitate and solid residue with a strong mineral acid to dissolve the precipitate whereby the solid residue remaining contains at least 90 weight percent $Fe_2O_3$.

2. The process of claim 1 wherein the alkali solution is contacted with about 70 to about 400 gms magnetic fly ash per liter of solution.

3. The process of claim 2 wherein the temperature of the alkali solution is from about 100° to 300° C.

4. The process of claim 3 wherein the concentration of the alkali solution is from about 10 to 30 weight percent.

5. The process of claim 4 wherein the alkali is a hydroxide selected from the group of sodium and potassium.

6. The process of claim 5 wherein the time of contact between the alkali solution and fly ash is from one-half to two hours.

7. The process of claim 6 wherein the strong mineral acid is selected from the group of HCl and $H_2SO_4$ and the solution is from 0.25 to 1.0 mineral acid.

8. The process of claim 7 wherein the weight to volume ratio is from 100 to 400 gms residue and precipitate per liter acid.

9. A process for recovering iron from fly ash containing iron oxide, silica and alumina which comprises:

separating the magnetic portion from the non-magnetic portion of the fly ash, contacting the magnetic portion of the fly ash with a strong alkali solution in a ratio of 200 to 300 gms fly ash per liter of soln, the soln containing 10 to 20 weight percent of an alkali metal hydroxide selected from the group consisting of sodium and potassium, at a temperature of 150° to 175° C. for one half to one hour, to dissolve about 90 weight percent of the silica and about 75 weight percent of the alumina the fly ash leaving a solid residue containing the iron oxide and forming a precipitate which is an alkali metal aluminosilicate hydrate, separating the solution from the precipitate and solid residue; and contacting the precipitate and residue with a 0.5 to 1 M solution of a strong mineral acid in a weight to volume ratio of 200 to 300 gms/liter acid, the acid being selected from the group consisting of hydrochloric and sulfuric acid, to dissolve the alkali metal aluminosilicate hydrate whereby the solid residue remaining contains at least 90 weight percent $Fe_2O_3$.

* * * * *